(12) United States Patent
Doblar et al.

(10) Patent No.: US 6,996,686 B2
(45) Date of Patent: Feb. 7, 2006

(54) MEMORY SUBSYSTEM INCLUDING MEMORY MODULES HAVING MULTIPLE BANKS

(75) Inventors: Drew G. Doblar, San Jose, CA (US); Chung-Hsiao R. Wu, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 284 days.

(21) Appl. No.: 10/328,682

(22) Filed: Dec. 23, 2002

(65) Prior Publication Data

US 2004/0123016 A1    Jun. 24, 2004

(51) Int. Cl.
    G06F 13/16    (2006.01)
(52) U.S. Cl. .................................................. 711/157
(58) Field of Classification Search ................ 711/114, 711/115, 157, 170; 714/6
    See application file for complete search history.

(56) References Cited

U.S. PATENT DOCUMENTS

| | | | |
|---|---|---|---|
| 4,025,903 A | 5/1977 | Kaufman et al. | |
| 4,376,300 A | 3/1983 | Tsang | |
| 4,584,681 A | 4/1986 | Singh et al. | |
| 4,604,751 A | 8/1986 | Aichelmann, Jr. et al. | |
| 4,747,070 A | 5/1988 | Trottier et al. | |
| 5,058,115 A | 10/1991 | Blake et al. | |
| 5,077,737 A | 12/1991 | Leger et al. | |
| 5,164,944 A | 11/1992 | Benton et al. | |
| 5,228,046 A | 7/1993 | Blake et al. | |
| 5,228,132 A | 7/1993 | Neal et al. | |
| 5,233,614 A | 8/1993 | Singh | |
| 5,255,226 A | 10/1993 | Ohno et al. | |
| 5,265,218 A | 11/1993 | Testa et al. | |
| 5,270,964 A | 12/1993 | Bechtolsheim et al. | |
| 5,276,834 A | 1/1994 | Mauritz et al. | |
| 5,291,496 A | 3/1994 | Andaleon et al. | |
| 5,490,155 A | 2/1996 | Abdoo et al. | |
| 5,502,675 A | 3/1996 | Kohno et al. | |
| 5,640,353 A | 6/1997 | Ju | |
| 5,682,394 A | 10/1997 | Blake et al. | |
| 5,758,056 A | 5/1998 | Barr | |
| 5,822,257 A | 10/1998 | Ogawa | |

(Continued)

FOREIGN PATENT DOCUMENTS

GB    2 226 665 A  *  4/1990

(Continued)

OTHER PUBLICATIONS

International search report application No. PCT/US 03/38917 mailed Oct. 5, 2004.

Primary Examiner—Kevin L. Ellis
(74) Attorney, Agent, or Firm—Meyertons Hood Kivlin Kowert & Getzel, P.C.; B. Noël Kivlin; Stephen J. Curran

(57) ABSTRACT

A memory subsystem including memory modules having multiple banks. A memory subsystem includes a memory controller and a plurality of memory modules. The plurality of memory modules may be coupled to the memory controller by a memory interconnect having a data path including a plurality of data bits. Each of the plurality of memory modules includes a circuit board and a plurality of memory chips mounted to the circuit board. The circuit board includes a connector edge for connection to the memory interconnect. Each of the plurality of memory chips may be configured to store data in a plurality of storage locations. Each of the plurality of memory modules may be coupled to a respective mutually exclusive subset of the plurality of data bits.

16 Claims, 4 Drawing Sheets

U.S. PATENT DOCUMENTS

| | | |
|---|---|---|
| 5,872,790 A | 2/1999 | Dixon |
| 5,909,541 A | 6/1999 | Sampson et al. |
| 5,923,682 A | 7/1999 | Seyyedy |
| 5,928,367 A | 7/1999 | Nelson et al. |
| 5,953,265 A | 9/1999 | Walton et al. |
| 5,978,952 A | 11/1999 | Hayek et al. |
| 5,987,628 A | 11/1999 | Von Bokern et al. |
| 6,009,548 A | 12/1999 | Chen et al. |
| 6,018,817 A | 1/2000 | Chen et al. |
| 6,038,680 A | 3/2000 | Olarig |
| 6,044,483 A | 3/2000 | Chen et al. |
| 6,052,818 A | 4/2000 | Dell et al. |
| 6,065,102 A | 5/2000 | Peters et al. |
| 6,070,255 A | 5/2000 | Dell et al. |
| 6,076,182 A | 6/2000 | Jeddeloh |
| 6,101,614 A | 8/2000 | Gonzales et al. |
| 6,115,828 A | 9/2000 | Tsutsumi et al. |
| 6,125,422 A | 9/2000 | May |
| 6,141,789 A | 10/2000 | Cypher |
| 6,158,025 A | 12/2000 | Brisse et al. |
| 6,167,495 A | 12/2000 | Keeth et al. |
| 6,181,614 B1 | 1/2001 | Aipperspach et al. |
| 6,202,110 B1 | 3/2001 | Coteus et al. |
| 6,209,056 B1 | 3/2001 | Suh |
| 6,209,113 B1 | 3/2001 | Roohparvar |
| 6,223,301 B1 * | 4/2001 | Santeler et al. ............... 714/6 |
| 6,233,717 B1 | 5/2001 | Choi |
| 6,246,616 B1 | 6/2001 | Nagai et al. |
| 6,401,167 B1 | 6/2002 | Barth et al. |
| 6,430,702 B1 | 8/2002 | Santeler et al. |
| 6,496,380 B1 * | 12/2002 | Li et al. ..................... 361/760 |
| 6,598,199 B2 * | 7/2003 | Tetrick ...................... 714/766 |
| 6,651,138 B2 | 11/2003 | Lai et al. |
| 6,715,116 B2 | 3/2004 | Lester et al. |
| 6,725,314 B1 * | 4/2004 | Dong ........................ 710/305 |
| 6,775,791 B2 * | 8/2004 | McAfee ........................ 714/6 |
| 6,785,835 B2 * | 8/2004 | MacLaren et al. ............. 714/6 |
| 2001/0001158 A1 | 5/2001 | Tetrick |
| 2004/0003165 A1 | 1/2004 | Schulz et al. |

FOREIGN PATENT DOCUMENTS

| | | |
|---|---|---|
| WO | WO 02080002 | 10/2002 |

* cited by examiner

MEMORY SUBSYSTEM INCLUDING MEMORY MODULES HAVING MULTIPLE BANKS

BACKGROUND OF THE INVENTION

1. Field of the Invention

This invention relates to computer system memory subsystems and, more particularly, to memory modules.

2. Description of the Related Art

In many computer systems, one or more processors may be connected to a memory subsystem through a system bus. For example, FIG. 1 illustrates a typical computer system configuration. Computer system 10 includes a plurality of processors 20A–20n connected to a memory subsystem 50 via a system bus 25. Memory subsystem 50 includes a memory controller 30 coupled to a system memory 40 via a memory interconnect 35. It is noted that elements referred to herein with a particular reference number followed by a letter may be collectively referred to by the reference number alone. For example, processor 20A–n may be collectively referred to as processor 20.

Generally speaking, processor 20 may access memory subsystem 50 by initiating a memory request transaction such as a memory read or a memory write to memory controller 30 via system bus 25. Memory controller 30 may then control the storing to and retrieval of data from system memory 40 by issuing memory request commands to system memory 40 via memory interconnect 35. Memory interconnect 35 may convey address and control information and data between system memory 40 and memory controller 30.

Memory subsystem 30 may be configured to store data and instruction code within system memory 40 for use by processor 20. As will be described further below, system memory 40 may be implemented using expandable blocks of memory such as a plurality of dual in-line memory modules (DIMM). Each DIMM may employ a plurality of random access memory chips such as dynamic random access memory (DRAM) or synchronous dynamic random access memory (SDRAM) chips, for example. Each DIMM may be mated to a system memory board via an edge connector and socket arrangement. The socket may be located on a memory subsystem circuit board and each DIMM may have an edge connector which may be inserted into the socket, for example.

The circuit board typically has contact pads or "fingers" arranged on both sides and along one edge of the circuit board. This edge of the circuit board is inserted into a socket having spring-loaded contacts for mating with the fingers. The socket arrangement allows the memory modules to be removed and replaced by a user. In many systems, the memory module connectors are mounted on a motherboard or system board such that the memory modules connect to a memory bus or interconnect one row after another or in a daisy chain. In some cases a computer system may be provided with a given number of memory modules and a user may add modules to expand the system memory capacity.

In many systems, to allow this expandability the memory modules are generally arranged into banks. The banks may be arranged such that each bank may include a particular range of addresses and so when a bank is added, additional memory space is added. In some systems, the banks may be arranged to also allow interleaving of data when it is stored to system memory, thereby possibly improving memory bandwidth.

However in many typical bank arrangements, all the data signals in the data path are routed to each memory module socket. For example, in FIG. 2, a memory subsystem is shown. Memory subsystem 50 includes a memory controller 30 coupled to a system memory including DIMMs 0–3 via a data path having data signals DQ 0–63. It is noted that data signals DQ0–63 are coupled to each DIMM. In the illustrated embodiment, bank 0 corresponds to DIMM 0, bank 1 corresponds to DIMM 1 and so forth. Within each DIMM, DQ 0–15 may correspond to a group of DRAM chips such as DRAM chips 0–4 and DQ 16–31 may correspond to DRAM chips 4–7 and so on. Thus if each data signal path or circuit board trace connected to a memory module socket is a transmission line, then each socket connection point on that transmission line may represent a stub.

Therefore in the illustrated embodiment, each signal in data path DQ0–63 may have as many as four stubs. For systems containing a small number of memory modules, the daisy chain configuration described above may not present any problems. However, in systems with a wide data bus and with many memory modules, a daisy chain configuration may present problems. Each stub in a signal's path may cause undesirable effects such as distortion on signal edges. This type of signal degradation may in turn cause system performance to suffer.

SUMMARY OF THE INVENTION

Various embodiments of a memory subsystem including memory modules having multiple banks are disclosed. In one embodiment, a memory subsystem includes a memory controller and a plurality of memory modules. The plurality of memory modules may be coupled to the memory controller by a memory interconnect having a data path including a plurality of data bits. Each of the plurality of memory modules includes a circuit board and a plurality of memory chips mounted to the circuit board. The circuit board includes a connector edge for connection to the memory interconnect. Each of the plurality of memory chips may be configured to store data in a plurality of storage locations. Each of the plurality of memory modules may be coupled to a respective mutually exclusive subset of the plurality of data bits.

Figure 1:
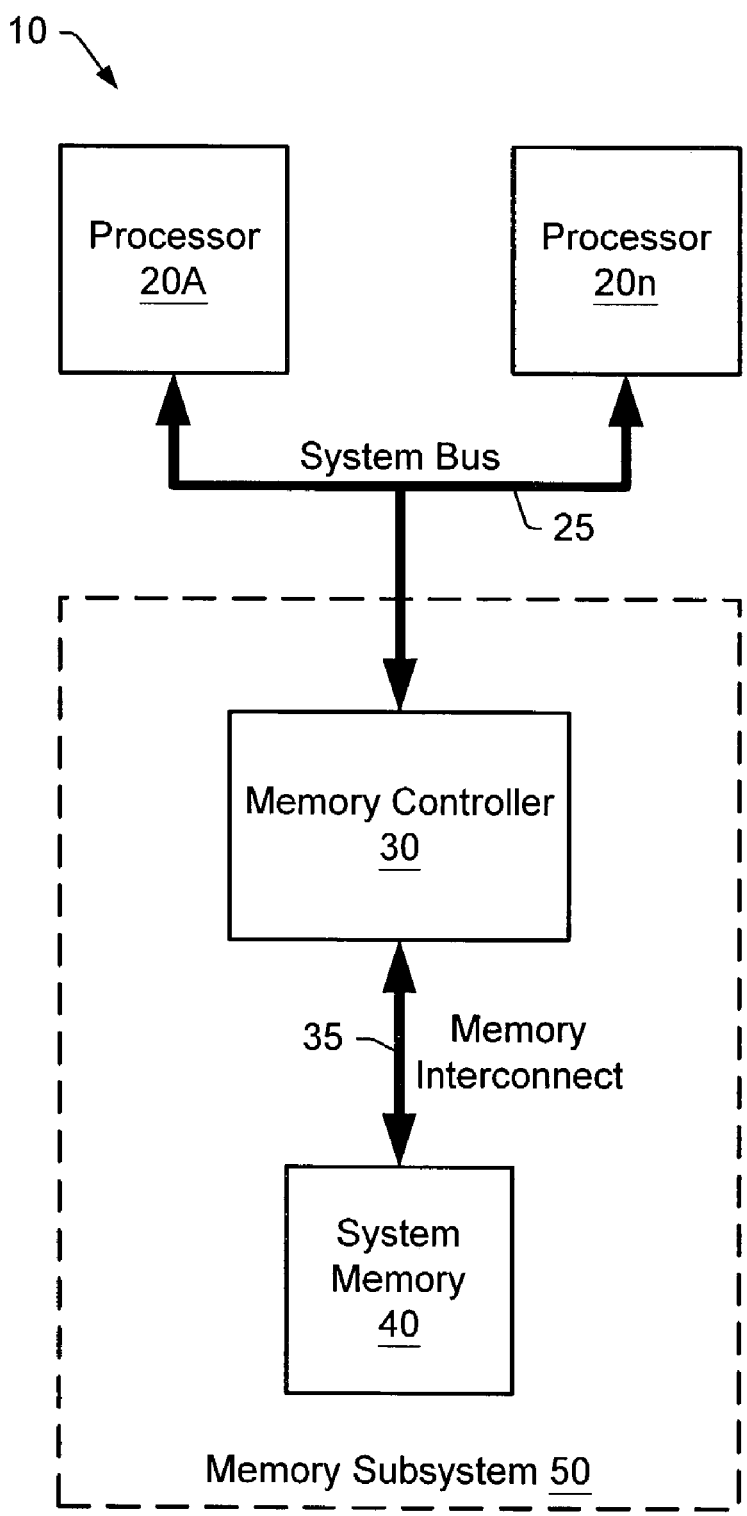
FIG. 1 is a block diagram of one embodiment of a computer system.
Figure 2:
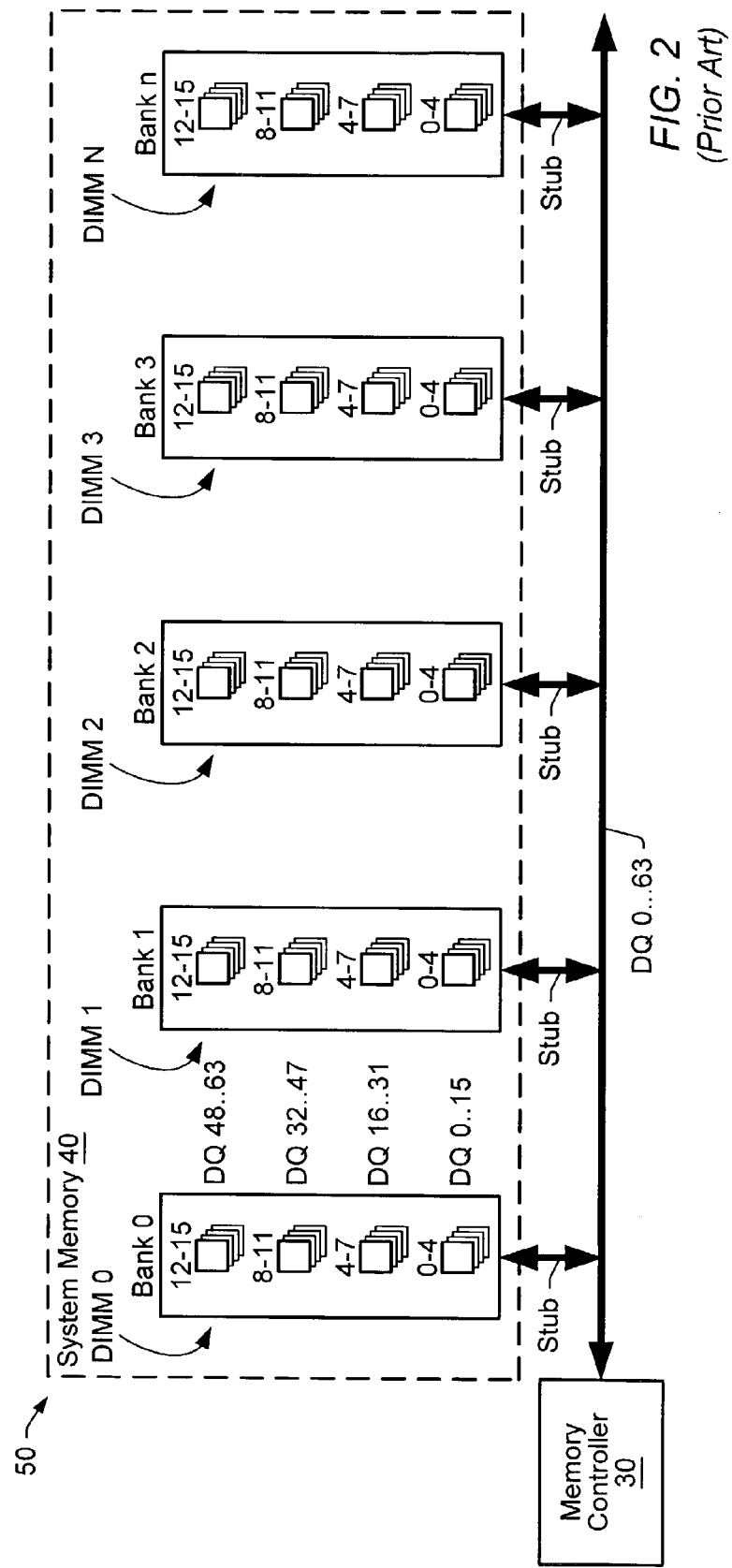
FIG. 2 is a block diagram of one embodiment of a memory subsystem.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 3:
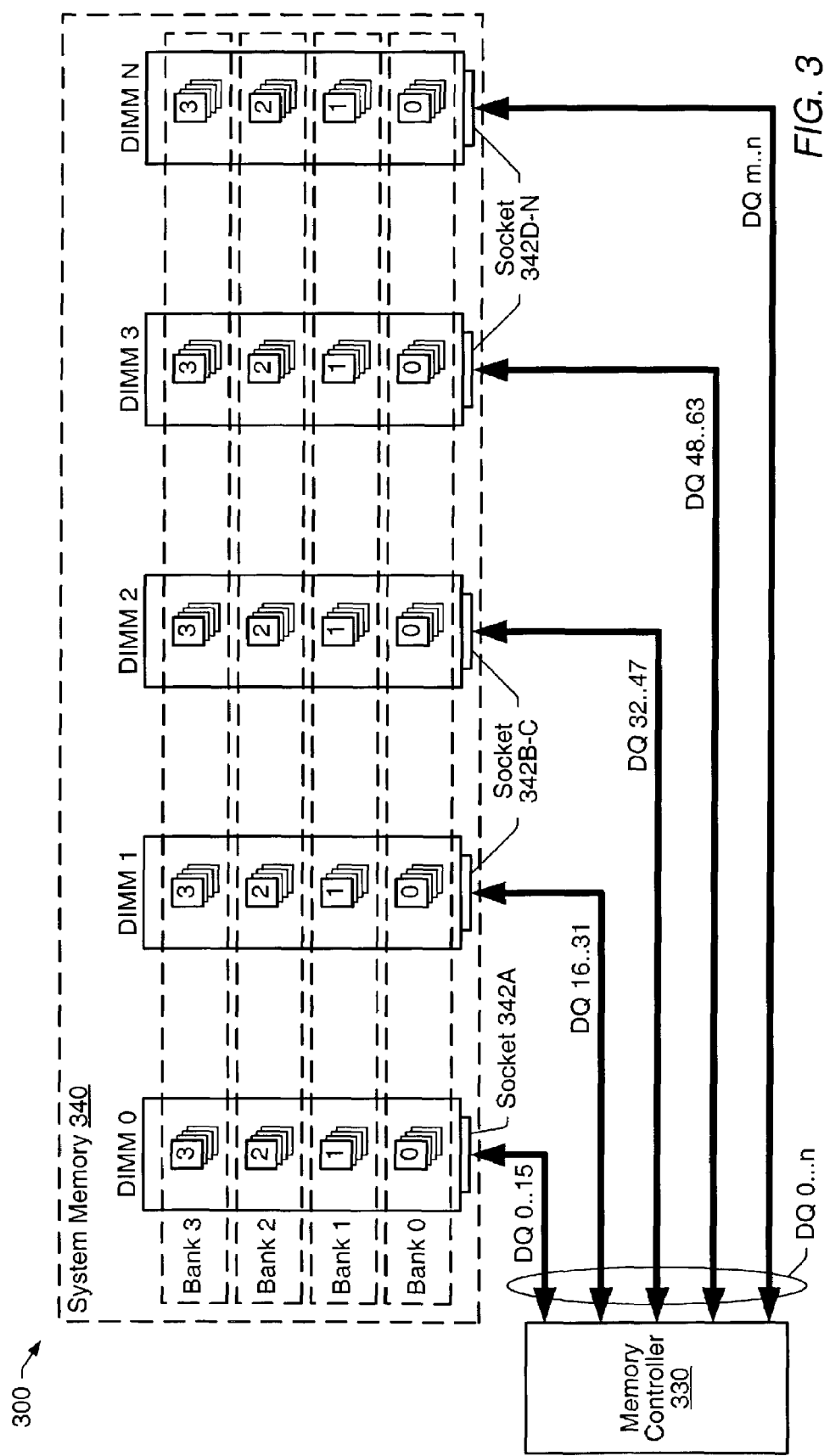
FIG. 3 is a block diagram of one embodiment of a memory subsystem.

Referring to FIG. 3, a block diagram of one embodiment of a memory subsystem 300 is shown. Memory subsystem 300 includes a memory controller 330 coupled to a system memory 340 via a data path including data signals DQ 0–n. The data path may be part of a memory interconnect such as memory interconnect 35 of FIG. 1. Thus, in addition to the data path signals DQ0–n, address and control signals and clock signals (not shown in FIG. 3) may also be conveyed to each DIMM with system memory 340.

As described above in conjunction with the description of FIG. 1, memory controller 330 may generate memory request operations in response to receiving memory requests from such devices as processor 20A or 20B of FIG. 1, for example. It is noted that memory controller 330 may also receive requests from other sources such as an I/O device (not shown). Memory controller 330 may also schedule the requests and generate corresponding memory requests for transmission on memory interconnect 35. The requests may include address and control information. For example, if the memory request is a memory read, memory controller 330 may generate one or more requests that include the requested address within system memory and corresponding control information such as such as start-read or pre-charge commands, for example. It is noted that memory controller 330 may be a stand alone integrated circuit chip or it may be included on the same integrated circuit chip as processor 20A and/or 20B.

In the illustrated embodiment, system memory 340 includes N dual in-line memory modules (DIMMs) designated DIMM 0–N. It is noted that any number of DIMMs may be used. Each of DIMMs 0–N includes 16 memory integrated circuit chips, although it is noted that other embodiments are contemplated that include other numbers of memory chips on each DIMM. On DIMM 0, the memory chips are arranged into four groups of four chips and designated 0–3. The memory chips are examples of any type of DRAM chip such as synchronous DRAM (SDRAM) or double data rate (DDR) SDRAM, for example.

In one embodiment, the data path conveys 16 data signals between memory controller 330 and each DIMM within system memory 340. For example, data path DQ0–15 is coupled between memory controller 330 and DIMM 0, DQ 16–31 is coupled between memory controller 330 and DIMM 1 and so on. Thus, in the illustrated embodiment, each group of data signals is a point-to-point data path from memory controller 330 to a respective DIMM. It is noted that other embodiments are contemplated which include other numbers of data signals being conveyed to each DIMM.

In one embodiment, each DIMM of system memory 340 is arranged into 4 external banks, designated banks 0–3. Each bank includes four memory chips from each DIMM. In addition, each memory chip may have internal banks. Each DIMM receives a mutually exclusive subset of the total number of data signals DQ 0–n in the data path. Therefore, each of banks 0–3 span across DIMM 0–n. In addition, depending upon the number of memory chips used on each DIMM, each bank may include other numbers of memory chips.

As described above, each connection point in a signal path may represent a stub in a transmission line, which may degrade signal integrity and system performance. By allowing an external bank to span all the DIMMs, a given group of data signals within a data path of a memory interconnect may be routed to a single DIMM. This bank arrangement may eliminate connection points in each data signal path which may be present in a typical system memory which has external banks allocated to single DIMM. Thus by removing some of these stubs, overall memory performance may be increased due to improved signal integrity of the data signals.

As will de described further below, each memory module may include logic (not shown in FIG. 3) configured to control bank selection and addressing of the memory chips. In addition, dependent upon the type of DRAM memory chips used, address and control signals may include address (addr), row address strobe (ras), column address strobe (cas), write enable (we) and chip select (cs), for example. It is noted that although the above embodiment is described using DIMMs, it is contemplated that in alternative embodiments, other types of memory modules may be used.

Figure 4:
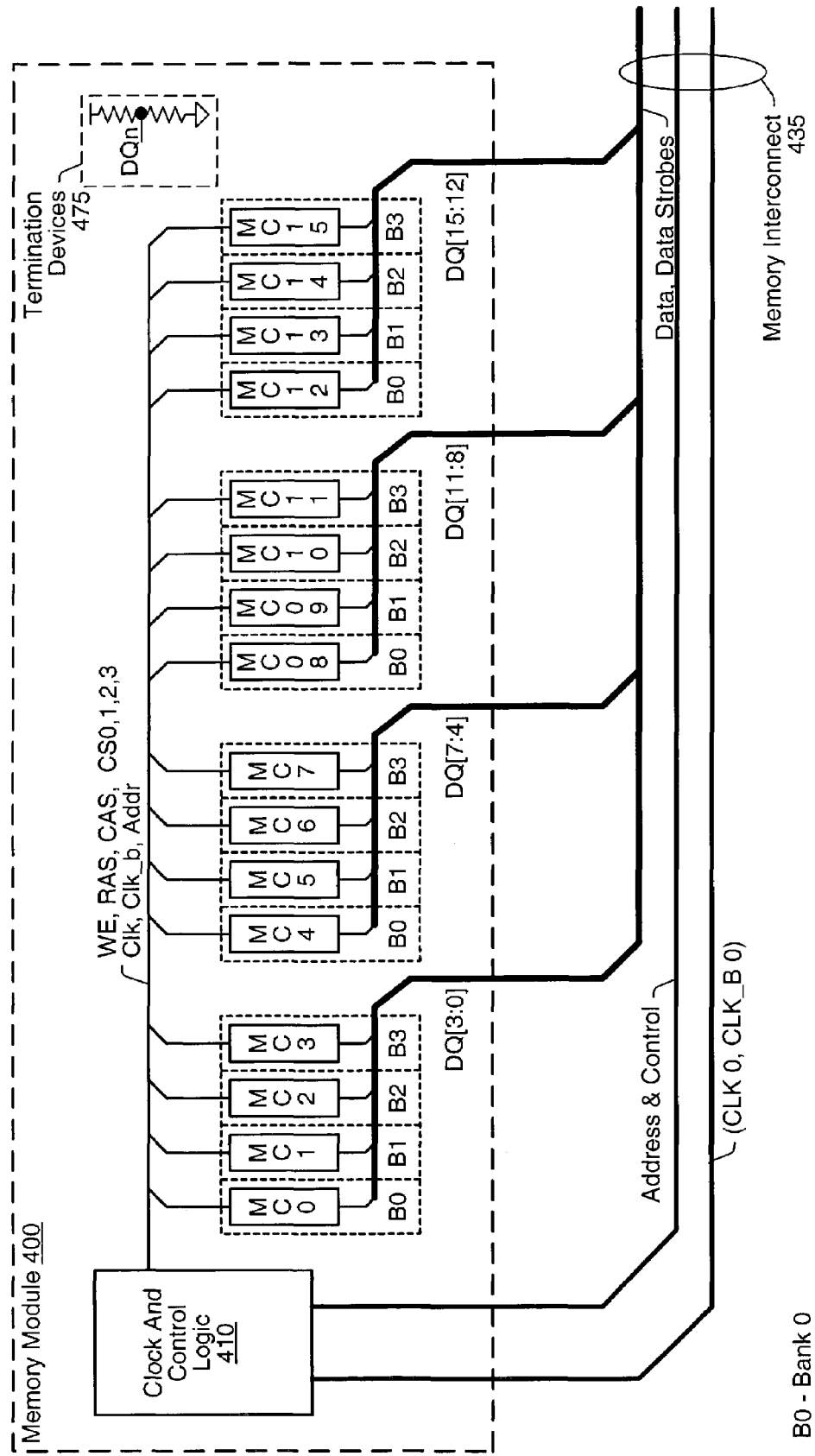
FIG. 4 is a block diagram of one embodiment of a memory module.

Turning to FIG. 4, a block diagram of one embodiment of a memory module of FIG. 3 is shown. Components that correspond to those in FIG. 1 and FIG. 3 have been numbered identically for clarity and simplicity. Memory module 400 includes a plurality of memory chips, designated MC 0–15 coupled to a clock and control logic unit 410. Memory module 400 is coupled to receive address and control information and to receive and send data and data strobes via memory interconnect 435. It is noted that the physical arrangement of MC 0–15 and clock and control logic 410 shown in FIG. 4 is only an exemplary arrangement. It is contemplated that other embodiments may use other component arrangements.

In the illustrated embodiment, MC 0–15 may be implemented in DDRSDRAM technology. Although it is noted that in other embodiments, MC 0–15 may be implemented in other types of DRAM. In such embodiments, other address and control signals (not shown) may be used.

Generally speaking, to access a DDRSDRAM device, a command encoding and an address must first be applied to the control and address inputs, respectively. The command is encoded using the control inputs. The address is then decoded, and data from the given address is accessed, typically in a burst mode.

In the illustrated embodiment, clock and control logic 410 may receive memory request encodings from a memory controller via memory interconnect 435. As described above, a memory request encoding may include an address and control information such as row address strobe (ras) column address strobe (cas), write enable (we) and chip select (cs) control signals. Clock and control logic 410 may generate appropriate control signals for accessing the appropriate bank of memory chips. In the illustrated embodiment, for example, write enable (WE), row address strobe (RAS), column address strobe (CAS) and chip selects (CS0, 1, 2 and 3) may be generated by clock and control logic 410 dependent upon the received address and control information. Further, clock and control logic 410 may receive clock signals such as clk 0 and clk_b 0 upon memory interconnect 435. Clock and control logic 410 may include clock logic such as a phase lock loop, for example, to generate clock signals for each of MC 0–15. It is noted that clock and control logic 410 may generate other signals (not shown) which may control MC 0–15 but have been left out for simplicity. A more detailed description of the operation of a DDRSDRAM device may be found in the JEDEC standard entitled "DDR SDRAM Specification" available from the JEDEC Solid State Technology Association.

In the illustrated embodiment, MC 0–15 are logically arranged into four external banks designated banks 0–3. Bank 0 includes MC 0, 4, 8 and 12. Bank 1 includes MC 1, 5, 9 and 13 and so on. It is noted that CS0 may enable bank 0, CS1 may enable bank 1, etc. As described above, memory module 400 is coupled only to one group of 16 data signals (e.g., DQ [15:0]) and each bank on a given memory module may be coupled to all 16 data signals connected to that memory module. For example, the data signals DQ [15:0] are distributed such that MC 0–3 are coupled to DQ [3:0], MC 4–7 are coupled to DQ [7:4], MC 8–11 are coupled to DQ [11:8] and MC 12–15 are coupled to DQ [15:12]. In addition, data strobes corresponding to each data signal (not shown) may be coupled to each of MC015.

In addition, memory module 400 may terminate each data signal and each data strobe signal. It is contemplated that in one embodiment, each memory module may include a plurality of termination devices 475 which may be mounted to the circuit board. In such an embodiment, each data signal DQn and each data strobe signal DQSn may be coupled to a respective termination device 475 such as a resistor divider or other suitable termination device, for example. In an alternative embodiment, each of memory chips MC0–15 may internally terminate the data and data strobe signals.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory subsystem comprising:
a memory controller; and
a plurality of memory modules coupled to said memory controller by a memory interconnect having a data path including a plurality of data bits;
wherein each of said plurality of memory modules includes:
a circuit board including a connector edge for connection to said memory interconnect; and
a plurality of memory chips mounted to said circuit board, wherein each of said memory chips is configured to store data in a plurality of storage locations;
wherein each of said plurality of memory modules is coupled to a respective mutually exclusive subset of said plurality of data bits;
wherein a portion of said plurality of memory chips belongs to a respective memory bank of a plurality of memory banks; and
wherein each of said plurality of memory chips within a given respective memory bank is coupled to a different subset of said plurality of data bits.

2. The memory subsystem as recited in claim 1, wherein each of said plurality of memory banks is coupled to each respective mutually exclusive subset of said plurality of data bits.

3. The memory subsystem as recited in claim 2, wherein each of said plurality of memory modules further includes a control unit coupled to said plurality of memory chips and configured to access each of said plurality of memory banks dependent upon an address conveyed upon said memory interconnect.

4. The memory subsystem as recited in claim 3, wherein each of said plurality of memory modules is configured to store data corresponding to a range of addresses.

5. The memory subsystem as recited in claim 1, wherein said connector edge of each of said plurality of memory modules is configured to be inserted into a corresponding socket.

6. The memory subsystem as recited in claim 1, wherein said plurality of memory modules includes ten memory modules.

7. The memory subsystem as recited in claim 1, wherein each of said plurality of memory modules includes a plurality of signal termination means for terminating each of said plurality of data bits.

8. The memory subsystem as recited in claim 7, wherein each of said plurality of signal termination means is coupled to a respective one of said plurality of data bits.

9. A computer system comprising:
a processor configured to execute instructions; and
a memory subsystem coupled to said processor via a system bus, wherein said memory subsystem includes:
a memory controller; and
a plurality of memory modules coupled to said memory controller by a memory interconnect having a data path including a plurality of data bits;
wherein each of said plurality of memory modules includes:
a circuit board including a connector edge for connection to said memory interconnect; and
a plurality of memory chips mounted to said circuit board, wherein each of said memory chips is configured to store data in a plurality of storage locations;
wherein each of said plurality of memory modules is coupled to a respective mutually exclusive subset of said plurality of data bits;
wherein a portion of said plurality of memory chips belongs to a respective memory bank of a plurality of memory banks; and
wherein each of said plurality of memory chips within a given respective memory bank is coupled to a different subset of said plurality of data bits.

10. The computer system as recited in claim 9, wherein each of said plurality of memory banks is coupled to said respective mutually exclusive subset of said plurality of data bits.

11. The computer system as recited in claim 10, wherein each of said plurality of memory modules further includes a control unit coupled to said plurality of memory chips and configured to access each of said plurality of memory banks dependent upon an address conveyed upon said memory interconnect.

12. The computer system as recited in claim 11, wherein each of said plurality of banks is configured to store data corresponding to a range of addresses.

13. The computer system as recited in claim 9, wherein said connector edge of each of said plurality of memory modules is configured to be inserted into a corresponding socket.

14. The computer system as recited in claim 9, wherein said plurality of memory modules includes ten memory modules.

15. The computer system as recited in claim 9, wherein each of said plurality of memory modules includes a plurality of signal termination means for terminating each of said plurality of data bits.

16. The computer system as recited in claim 15, wherein each of said plurality of signal termination means is coupled to a respective one of said plurality of data bits.

* * * * *